United States Patent
Conrad

(10) Patent No.: US 9,410,862 B2
(45) Date of Patent: Aug. 9, 2016

(54) DEVICE FOR MEASURING A PRESSURE WITH AT LEAST ONE PRESSURE SENSOR HAVING AT LEAST ONE ACTIVE SENSOR SURFACE

(71) Applicant: Pfeiffer Vacuum GmbH, Asslar (DE)

(72) Inventor: Armin Conrad, Herborn (DE)

(73) Assignee: PFEIFFER VACUUM GMBH, Asslar (DE)

( * ) Notice: Subject to any disclaimer, the term of this patent is extended or adjusted under 35 U.S.C. 154(b) by 35 days.

(21) Appl. No.: 14/085,949

(22) Filed: Nov. 21, 2013

(65) Prior Publication Data

US 2014/0174188 A1 Jun. 26, 2014

(30) Foreign Application Priority Data

Dec. 21, 2012 (DE) .......................... 10 2012 112 862

(51) Int. Cl.
| | |
|---|---|
| G01L 9/00 | (2006.01) |
| G01L 9/08 | (2006.01) |
| G01L 11/00 | (2006.01) |
| G01L 19/02 | (2006.01) |
| G01L 27/00 | (2006.01) |

(52) U.S. Cl.
CPC ................. *G01L 9/00* (2013.01); *G01L 9/0016* (2013.01); *G01L 9/08* (2013.01); *G01L 11/002* (2013.01); *G01L 19/02* (2013.01); *G01L 27/00* (2013.01)

(58) Field of Classification Search
CPC ....... G01L 7/00; G01L 7/082; G01L 19/0645; G01L 9/00; G01L 9/0016; G01L 9/08; G01L 19/02; G01L 27/00
USPC ..................................................... 73/700, 715
See application file for complete search history.

(56) References Cited

U.S. PATENT DOCUMENTS

| | | | | |
|---|---|---|---|---|
| 3,193,774 | A | * | 7/1965 | Clapper ........................ 330/294 |
| 3,789,666 | A | * | 2/1974 | Favre ............................... 73/702 |
| 5,310,610 | A | | 5/1994 | Furobayashi |
| 5,804,457 | A | | 9/1998 | Benz |
| 7,918,135 | B2 | | 4/2011 | Hammerschmidt |
| 2007/0022106 | A1 | * | 1/2007 | Brandt et al. ...................... 707/4 |
| 2014/0053651 | A1 | | 2/2014 | Besling et al. |

FOREIGN PATENT DOCUMENTS

| | | |
|---|---|---|
| DE | 102 01 054 | 1/2003 |
| DE | 10 2011 082 52 | 11/2012 |
| EP | 524 381 | 1/1993 |
| GB | 2 470 714 | 12/2010 |
| GB | 2470714 B * | 3/2014 ............ G01L 9/0019 |

* cited by examiner

*Primary Examiner* — Lisa Caputo
*Assistant Examiner* — Nathaniel T Woodward
(74) *Attorney, Agent, or Firm* — Abelman, Frayne & Schwab

(57) ABSTRACT

A device for measuring pressure having at least one pressure sensor with at least one active sensor surface, an oscillating and/or variable temperature counter-surface arranged opposite the at least one sensor surface, wherein the sensor surface and the counter-surface are arranged in a hollow body, and the hollow body has at least one opening, and wherein at least one alternating signal amplifier is provided.

9 Claims, 2 Drawing Sheets

DEVICE FOR MEASURING A PRESSURE WITH AT LEAST ONE PRESSURE SENSOR HAVING AT LEAST ONE ACTIVE SENSOR SURFACE

BACKGROUND OF THE INVENTION

1. Field of the Invention

The invention relates to a device for measuring a pressure with at least one pressure sensor having at least one active sensor surface.

2. Description of the Prior Art

From practice, various pressure sensors are known, which are configured, for example, as membrane sensor, piezoelectric sensor, electret, piezoresistive sensor, or as Pirani sensor.

The disadvantage of the sensors, which are known from practice, consists in that they often have a large thermal and temporal drift, that is, as a result of thermal conditions or age, a zero point drift occurs. In part, these sensors also fail to achieve a sufficient resolution.

The objects of the invention consist in providing a device for measuring pressure having at least one pressure sensor with at least one active sensor surface, in particular in the application field of vacuum pressure sensors, wherein a zero point drift is considerably reduced or does not occur at all, and which has a high resolution while moreover having a cost effective design.

SUMMARY OF THE INVENTION

The object of the invention is achieved by providing a device for measuring a pressure with at least one pressure sensor having at least one active sensor surface, with the at least one sensor surface being arranged opposite an oscillating and/or variable temperature counter-surface, with the sensor surface and the counter-surface being arranged in a hollow body or forming a portion of a hollow body, wherein the hollow body has at least one opening, and with at least one alternating signal amplifier being provided.

The device according to the invention for measuring a pressure with at least one pressure sensor having at least one active surface is advantageously designed in such a manner that a oscillating and/or variable temperature counter-surface is arranged opposite the at least one sensor surface, in that side walls are provided between the counter-surface and the sensor surface, which, together with the sensor surface and the counter-surface, form a hollow body, wherein the hollow body has at least one opening, and in that at least one alternating signal amplifier is provided.

Another advantageous embodiment of the device according to the invention for measuring a pressure with at least one pressure sensor having at least one active sensor provides that a oscillating and/or variable temperature counter-surface is arranged opposite the at least one sensor surface, and in that the counter-surface or the sensor surface is an internal portion of a hollow cylinder which surrounds the corresponding surface at least partially, in that the hollow cylinder is configured so that it is closed on its front sides with the exception of openings and encloses a body, and in that at least one alternating signal amplifier is provided.

The devices according to the invention have the advantage that they comprise pressure sensors that react to a pressure change, and are therefore associated with little thermal and temporal drift. In principle, all the known measurement principles can be used; however, it is advantageous to use those having a small thermal drift of the pressure slope dp/dT (T). The offset drift is in principle suppressed.

According to the invention, the pressure variation is provided either by a fluctuating volume in front of the active sensor surface, or by a fluctuating temperature of a hot surface in front of the active sensor surface.

The devices according to the invention have the advantage that the counter-surface either undergoes a periodic oscillating motion with respect to the sensor surface, or the counter-surface is heated periodically, for example, by metallization of ceramic and ohmic heating with alternating current or direct current (DC) with superimposed alternating current, so that the molecules arriving from the counter-surface and impinging on the sensor surface are registered there as a force effect, respectively as transporting heat, and they generate a signal proportional to the pressure.

The central components of the devices according to the invention are a pressure sensor, a counter-surface opposite the active sensor surface, which advantageously, along with side walls with respect to the sensor surface, encloses a volume. It is also possible to arrange side surfaces on the sensor surface, which are arranged in the direction of the counter-surface and which enclose the volume. The counter-surface can also completely enclose the sensor surface in two dimensions, by having the counter-surface forming, for example, a portion of a hollow body, for example, of a concentric cylinder. It is also possible for the sensor surface to be a portion of a hollow body, for example, of a concentric cylinder, which completely encloses the counter-surface. An additional component of the device is an alternating signal amplifier. The alternating signal amplifier can advantageously be configured as a frequency selective alternating signal amplifier. In this frequency selective alternating signal amplifier, the center frequency is adjusted to the fundamental frequency of the excitatory pressure change signal. It is advantageous for the amplification to be set or automatically set so that the signal levels are within the range required for the analog-digital conversion (A/D conversion).

In addition, it is advantageous to provide evaluation software which detects and represents, as well as possible according to the state of the art, the peak value and/or effective value of the alternating signal. In the case of the smallest signals, the resolution (minimum pressure value) can be changed to the detriment of the response speed (a long, but still acceptable time for averaging).

The devices according to the invention can advantageously be constructed in principle using any pressure sensors. An advantageous application field consists of vacuum pressure sensors. In the case of a thermal pressure fluctuation generation, the sensors based on ionization are not used. In the case of Pirani sensors, the thermal time constant should be as small as possible. Ideally, it is not very much higher than the alternating period duration.

According to a particularly advantageous embodiment of the invention, openings, which are advantageously configured as gaps, are provided between the counter-surface and the sensor surface. The counter-surface is advantageously configured as a surface which can be moved freely opposite the sensor surface.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
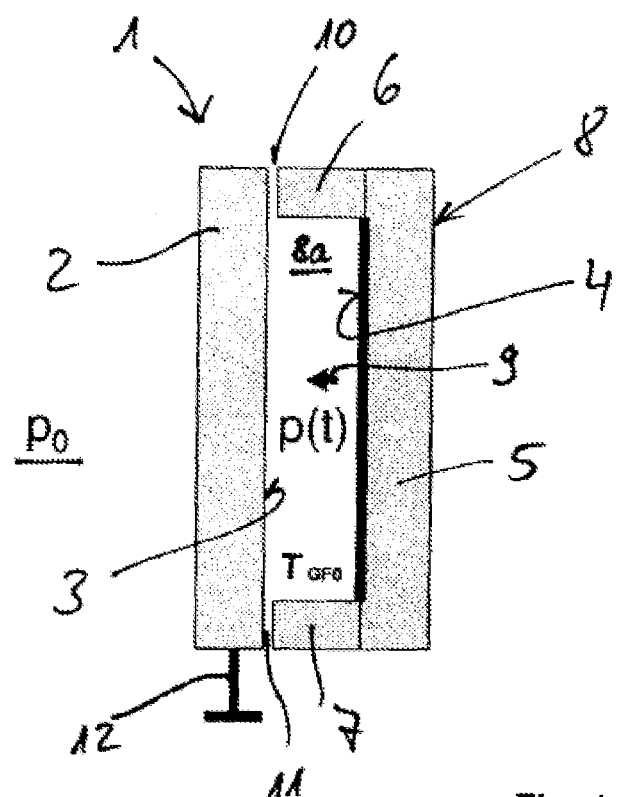
FIG. 1 a pressure measuring device according to the present invention with a pressure change due to fluctuation of a temperature.

FIG. 1 shows a device 1 with a pressure sensor 2 which comprises an active sensor surface 3. A variable temperature counter-surface 4 is arranged opposite the active sensor surface 3. On a support 5 of the variable temperature counter-surface 4, side walls 6, 7 are arranged, which, together with the variable temperature counter-surface 4 and the active sensor surface 3, form a hollow body 8 which encloses a volume 8a. Outside of the volume 8a, a pressure p0 is present. Within the volume 8a, the pressure p(t) is present, that is a pressure which changes with time.

By means of gaps 10, 11, a pressure compensation can occur via a gap admittance of the gaps 10, 11. The gaps 10, 11 are selected in such a manner that a slow pressure compensation occurs. 12 denotes a heat sink for a heat flow at "high" pressure.

The pressure p(t) can be described as follows: The counter-surface 4 is heated periodically, (for example, metallization of ceramic and ohmic heating with alternating current or direct current (DC) with superposed alternating current), so that the molecules arriving from the counter-surface 4 and impinging on the sensor surface 3 act as a force in the direction of the arrow 9, or are registered as heat transporting and generate a signal proportional to the pressure according to the following equations:

where:

$p_w(t)$—alternating component of the pressure as a function of time t.

$$p(t) = p_0 + p_w(t) \quad \text{(Equation 1)}$$

$$p_w(t) = p_0 \frac{\cdot dT_{GF}(t)}{T_{GF0}} \quad \text{(Equation 2)}$$

wherein: $p_0$=container pressure $T_{GF0}$=temperature of the counter-surface

The sensor signal then has the following appearance:

where:

$U_s$—sensor signal $U_o$—sensor signal at time t=0

$U_w(t)$—alternating component of the signal proportional to the pressure as a function of time t $k_p$—constant factor of pressure p—pressure $U_{off}$—zero point drift (offset signal)

$$U_s = U_0 + U_w(t) \quad \text{(Equation 3)}$$
$$= k_p \cdot p + U_{off}$$

Figure 2:
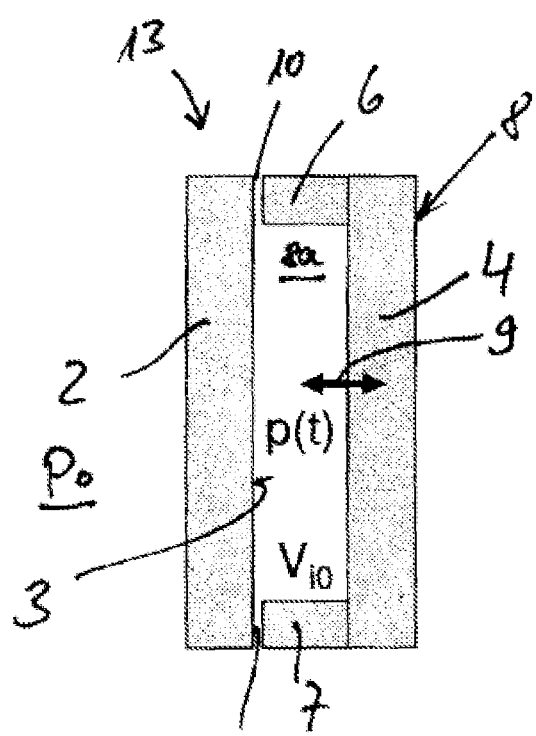
FIG. 2 a pressure measuring device according to the present invention with a pressure change due to volume fluctuation.

FIG. 2 shows a device 13, in which a pressure change is generated by a fluctuating volume.

The device 13 comprises a pressure sensor 2 having an active sensor surface 3. Opposite, an oscillating counter-surface 4 is arranged. Side walls 6, 7, together with the active sensor surface 3 and the oscillating counter-surface 4, form a volume 8a. The counter-surface 4 oscillates in the direction of the double arrow 9. Through the gaps 10, 11, a slow pressure compensation is possible. The pressure compensation time constant is clearly greater than the alternating period duration.

Outside of the volume 8a, a pressure p0 is present. This can be the container pressure $p_0$ of a vacuum chamber.

The sensor pressure is here determined as follows:

$$p(t) = p_0 + p_w(t) \quad \text{(Equation 4)}$$

$$p_w(t) = -p_o \cdot dV_i(t)/V_{io} \quad \text{(Equation 5)}$$

where: $p_0$=container pressure $V_{i0}$=sensor inner volume $dV_i(t)$—relative change of sensor inner volume as a function of time t $V_{io}$—sensor inner volume at t=0.

The sensor signal is then determined as follows:

$$U_s = U_0 + U_w(t) \quad \text{(Equation 6)}$$
$$= k_p \cdot p + U_{off}$$

The functions can be described as follows according to FIG. 2: The counter-surface 4 moves with periodic oscillating motion opposite the active sensor surface 3, so that the pressure follows accordingly (for example, electromagnet or piezo):

$$p(t) = p_0 + p_w(t) = p_a + p_0 \cdot s(t) \quad \text{(Equation 7)}$$

where:

s(t)—relative change of volume or relative temperature change as a function of time t.

According to FIG. 1, the counter-surface 3 is heated periodically (for example, metallization of ceramic and ohmic heating with alternating current or DC with superposed alternating current), so that the molecules arriving from the counter-surface 4 and impinging on the sensor surface 3 are registered there as a force effect in the direction of the arrow 9, or as heat transporting and generate a signal proportional to the pressure according to equation 9.

The alternating component $U_w(t)$ of the signal which is proportional to the pressure $$U(t) = U_0 + U_w(t) = k_p \cdot p(t) + U_{off} \quad \text{(Equation 8)}$$

is now, as described above, amplified selectively (v), A/D converted, digitally processed, and output.

Now, it results from Equations 7 and 8

$$p_0 = \frac{\frac{U_w}{k_p}}{\frac{s}{V}} \quad \text{(Equation 9)}$$

where:

s—relative change of volume or temperature

V—volume $U_w$—alternating component of the signal proportional to the pressure.

where $U_w$ and s now denote the effective values. In the case of a fluctuation in the volume, s is the relative change in volume $$s = -\frac{dV}{V} \quad \text{(Equation 10)}$$

where:
dV—relative change of volume;
and in the case of a temperature fluctuation, it denotes the relative temperature change $$s = \frac{dT}{T} \quad \text{(Equation 11)}$$

where:
dT—relative temperature change.
of the hot surface.

Figure 3:
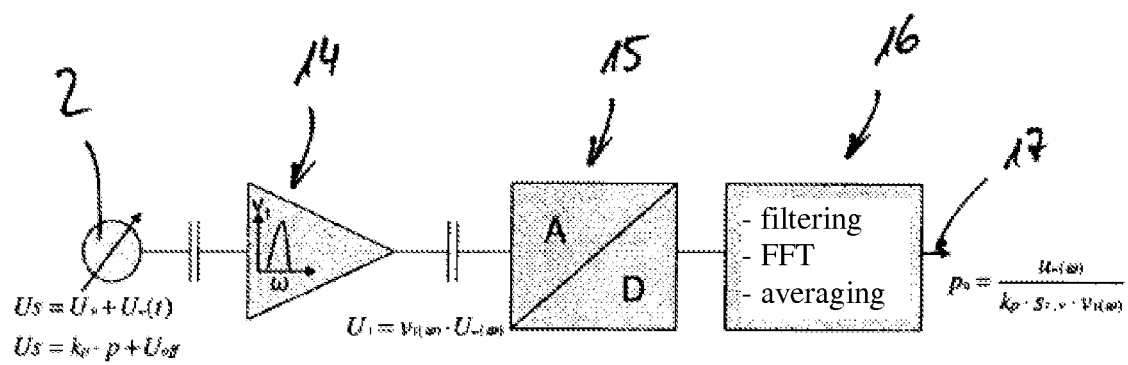
FIG. 3 a diagram of signal processing.

FIG. 3 shows a diagram of signal processing. From the pressure sensor 2, a signal is passed on to a frequency selective analog amplification 14. Subsequently, the signal is applied to an analog-digital converter (A/D converter) 15. Subsequently, an evaluation occurs in a calculation unit 16, and finally the output 17 occurs.

The Fourier spectrum of the selectively amplified sensor signal (effective values) appears as follows:

$$U_w(\omega) = \sum_{i=1}^{\infty} u_w(i\omega) \quad \text{(Equation 12)}$$

where:
$U_w(\omega)$—alternating component of the signal proportional to the pressure as a function of angular frequency;
$u_w(i\omega)$—summands of $U_w(\omega)$.

The measurement results of the static pressure appear as follows:

$$p_0 = \frac{\bar{u}_w(\omega)}{k_p \cdot S_{T,V} \cdot v_1(\omega)} \quad \text{(Equation 13)}$$

where: $\bar{u}w(\omega)$—average of $u_w(\omega)$
$S_{T,V}$—relative change of temperature, volume
$v_1(\omega)$—frequency;

In the case of a periodic pressure change, the general gas equation applies $$p = \frac{N}{V}kT \quad \text{(Equation 14)}$$

where N=number of particles
V=volume
T=temperature
$P_0$=static container pressure The pressure change due to temperature and/or volume change can be represented as follows:

$$p(t) = p_0 + p_0 \frac{dT_{GF}(t)}{T_{GF0}} - p_0 \frac{dV_i(t)}{V_{i0}} \quad \text{(Equation 15)}$$
$$= p_0 \cdot (1 + s_T - s_V)$$

The most sinusoidal possible periodic change with ω is $$\frac{dT_{GF}(t)}{T_{GF0}} = \sum_{i=1}^{\infty} a_i \cdot \sin(i\omega t + \gamma_i) \quad \text{(Equation 16)}$$

where:
$a_i$ - coefficient
$\gamma_i$ - angle;

$$\frac{dV_i(t)}{V_{i0}} = \sum_{i=1}^{\infty} b_i \cdot \sin(i\omega t + \varphi_i) \quad \text{(Equation 17)}$$

where:
$b_i$ - coefficient
$\omega_i$ - angle.

Because of the limitation to signal fluctuation, there is no sensor error due to the zero point drift ($U_{off}$) resulting from heat or aging. Only the drift in the slope caused by the basic nonlinearity of the respective sensor 2 still has an error causing effect, wherein the thermally caused proportion can be compensated for using routine methods.

An additional advantage of the invention is that, because of the transition from DC coupling to AC coupling in the amplifier chain, there is no offset drift, and the remaining naturally very slight nonlinearity of the amplifiers in comparison to that of the sensor can be neglected.

The device according to the invention moreover has the advantage of a higher resolution with a known sensor system, or of identical or improved resolution with lower costs for thermostat control and temperature compensation.

In addition, a more compact and more advantageous design is possible.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A device for measuring pressure, comprising at least one pressure sensor having at least one active sensor surface, a variable temperature counter-surface (4) arranged opposite the at least one sensor surface (3), the temperature of the counter-surface, which is formed by metallization of ceramic, is varied by periodic Ohmic heating the sensor surface (3) and the counter-surface (4) being arranged in a hollow body (8) or form a portion of a hollow body (8), wherein the hollow body (8) comprises at least one opening (10, 11); and at least one alternating signal amplifier (14), for amplifying an output of the one pressure sensor.

2. A device according to claim 1, wherein side walls (6, 7) are provided between the counter-surface (4) and the sensor surface (3), forming together with the sensor surface (3) and the counter-surface (4) the hollow body (8).

3. A device according to claim 1, wherein the counter-surface (4) or the sensor surface (3) is an internal portion of a hollow cylinder which surrounds the corresponding surface at least partially, wherein the hollow cylinder is configured so that it is closed on its curved sides except for openings, and encloses a volume.

4. A device according to claim 1, wherein the at least one opening (10) is configured as a gap.

5. A device according to claim 1, wherein evaluation software is provided.

6. A device according to claim 1, wherein the pressure sensor (2) is configured as a pressure sensor that reacts to a pressure change.

7. A device according to claim 1, wherein the pressure sensor (2) is configured as a membrane sensor, a piezoelectric sensor, an electret, a piezoresistive sensor, or as a Pirani sensor.

8. A device according to claim 1, wherein the alternating signal amplifier (14) is configured as a frequency selective alternating signal amplifier (14).

9. A device for measuring pressure, comprising at least one pressure sensor having at least one active sensor surface, a counter-surface (4) arranged opposite the at least one sensor surface (3), means for periodically heating the counter-surface for varying the temperature thereof, side walls (6, 7) provided between the sensor surface (3) and the counter-surface (4) wherein the side walls (6,7), the counter-surface (4), and the sensor surface (3) define together a hollow body (8), wherein the hollow body (8) comprises at least one opening (10, 11); and at least one alternating signal amplifier (14), for amplifying an output of the one pressure sensor.

* * * * *